United States Patent [19]
Cox et al.

[11] Patent Number: 5,335,329
[45] Date of Patent: Aug. 2, 1994

[54] APPARATUS FOR PROVIDING DMA FUNCTIONALITY TO DEVICES LOCATED IN A BUS EXPANSION CHASSIS

[75] Inventors: Stanley E. Cox, Farmers Branch; Mark E. Ish, Harris County, both of Tex.

[73] Assignee: Texas Microsystems, Inc., Houston, Tex.

[21] Appl. No.: 732,471

[22] Filed: Jul. 18, 1991

[51] Int. Cl.$^5$ .................. G06F 13/14; G06F 13/38
[52] U.S. Cl. .................. 395/325; 395/275; 264/DIG. 1; 264/239.9; 264/240; 264/242.3
[58] Field of Search .................. 395/325, 275

[56] References Cited

U.S. PATENT DOCUMENTS

| | | | |
|---|---|---|---|
| 3,573,741 | 4/1971 | Gavril | 395/275 |
| 4,419,728 | 12/1983 | Larson | 395/325 |
| 4,660,141 | 4/1987 | Ceccon et al. | 395/275 |
| 4,680,674 | 7/1987 | Moore | 361/686 |
| 4,805,090 | 2/1989 | Coogan | 395/275 |
| 5,123,092 | 6/1992 | Buxton et al. | 395/250 |

OTHER PUBLICATIONS

"SBus Specification A.1", by Edward H. Frank and Mitch Bradley, Sun Microsystems, Inc., 1990. 158 pages.

Primary Examiner—Robert B. Harrell
Assistant Examiner—Richard L. Ellis
Attorney, Agent, or Firm—Vinson & Elkins

[57] ABSTRACT

An expansion system for a bus-architecture system is disclosed, particularly for an SBus-compatible system. The expansion system includes a host expansion board which fits into one of the expansion slots connected to the SBus, a cable connected to the host expansion board, and an expansion chassis connected to the cable. A memory management unit is included in the host expansion board, for mapping physical addresses on said SBus into addresses of add-on functions installed in the expansion chassis. This mapping allows for varying memory size functions to be installed into a single expansion slot. The MMU also copies the ID PROMs from each of the add-on functions into RAM on the host expansion board, so that such expansion is transparent to the driver software. Latches and control functions are also provided so that one of the add-on functions can be the SBus DMA master within the timing specifications; this is enabled by initiating the DMA cycle early in the expansion chassis, and by latching the communicated states. The data and acknowledge signals can be synchronized with SBus, and succeeding data can be pipelined so that burst write DMA operations can be performed.

8 Claims, 9 Drawing Sheets

APPARATUS FOR PROVIDING DMA FUNCTIONALITY TO DEVICES LOCATED IN A BUS EXPANSION CHASSIS

This invention is in the field of data processing, and is more specifically directed to architectures for expansion equipment for connection to a common bus.

BACKGROUND OF THE INVENTION

In the field of data processing equipment, particularly microcomputers and microcomputer-based workstations, the ability to add hardware devices is an important feature. Examples of such add-on boards and functions include add-on memory cards, communication ports, disk and other storage unit controllers, control functions such as timers, and input/output ports and functions (including such functions as display drivers, analog and digital data acquisition cards, printer interfaces, and the like). Provision for such add-on functions allows the purchaser or user of a workstation, for example, to incorporate only those hardware functions that are required for the particular application of the workstation. This allows the cost of the basic workstation to be kept relatively modest, and provides the ability to upgrade the workstation capability and functionality far beyond that provided by the basic unit.

The architecture of most microcomputers includes a bus along which many bits of information may be communicated in parallel among several integrated circuits. Expansion slots are often provided which are connected to the bus, and into which hardware add-on boards and functions can be inserted and implemented. These expansion slots are commonly physically implemented on the "motherboard" of the computer, i.e., the circuit board containing the CPU and other circuitry which perform the basic operations of the computer. Communication between the CPU and the add-on devices by way of the bus, particularly where the expansion ports are not dedicated to particular functions, can be done by way of relatively straightforward software routines. In addition, this architecture allows for software compatibility among the various configurations of add-on hardware.

While this architecture has proved to be quite successful in the data processing industry, certain limitations are inherent. Firstly, communication between the CPU and add-on boards via a common bus can result in a communication bottleneck during such times as the bus is occupied for one given task, with other tasks waiting until the bus is released. This bottleneck becomes an even larger problem if direct memory access (DMA) or other communication between add-on cards is desired, as such communication does not depend on CPU availability and thus can greatly increase bus traffic. In addition, this architecture requires arbitration circuitry and other hardware control to ensure that bus contention or conflict does not occur.

Another significant limitation is the number of slots physically available for add-on functions. This limitation is particularly true for those computers which memory-map their expansion slots so that each expansion slot is addressable by the CPU in the same manner as main computer memory (i.e., with a memory address). In such arrangements, each expansion slot generally has a pre-assigned portion of the available memory space, such that accesses to the add-on card are accomplished by reading or writing to "memory" locations within the address space assigned to the slot.

An example of a particular computer workstation architecture which has a limited number of memory-mapped expansion slots are the computer workstations manufactured and sold by Sun Microsystems, Inc., particularly those incorporating the SBus architecture. The SBus is the main bus in this type of computer, by which the CPU communicates with its main memory and by which the CPU also communicates with devices in a limited number of expansion slots connected thereto. Referring now to FIG. 1, an example of this system will now be described. For further detail, incorporated herein by this reference is *The SBus Specification*, Revision A1 (Sun Microsystems, Inc., 1990).

FIG. 1 illustrates one configuration of an SBus-based system. In this architecture, SBus is connected to slots $6_0$ through $6_5$, which are used to connect particular functions into the system. For example, dynamic memory DRAM is accessed via slots $6_0$ and $6_1$, video RAM is connected to SBus via slot $6_2$, and communications interfaces such as Ethernet and SCSI (small computer serial interface) are accessed via slot $6_3$. In this conventional SBus-based system, slots $6_0$, $6_1$, and $6_3$ are logical slots rather than physical slots, and therefore are not available for expansion. Video slot $6_2$ is a physical slot which is generally used for the image storage for the graphics display of the system. Two physical expansion slots $6_4$ and $6_5$ are also connected to SBus, into which additional system functions may be installed into the system. In this so-called host-based configuration, CPU 2 is connected to SBus via SBus controller 4. As is well known, SBus controller 4 generates the clock signal on SBus which is received by the devices connected thereto, provides the virtual to physical address translation required in conventional SBus cycles, and also performs bus arbitration. In this host-based configuration, SBus controller 4 also serves as a private memory management unit for CPU 2, via which CPU 2 communicates to the devices on SBus.

An alternative arrangement to that shown in FIG. 1 is a so-called symmetric configuration, where CPU 2 is connected direction to SBus, and accesses SBus and the devices thereupon in similar manner as the other functions on SBus.

By way of further background, a typical SBus cycle will now be described in detail with reference to FIG. 2; this cycle is typical in either of the host-based or symmetric configurations. The typical SBus cycle is a so-called direct virtual memory access (DVMA) cycle, which consists of a translation cycle followed by one or more slave cycles. The operative lines of SBus are illustrated in FIG. 2 for clarity. SBus controller 4 generates the clock signal Clock in a periodic manner, for example on the order of 25 MHz. A DVMA cycle is initiated by one of the devices on SBus driving line Request* to a low active level (the * designation indicating that the signal is active low); SBus controller 4 issues a low level on line Grant* if the requesting device is to be granted SBus.

According to SBus specifications, the requesting device must place the virtual address on the data lines of SBus by the end of the first full clock cycle after Grant* going low; also at this time, the size of the transfer must be indicated on lines Siz(2:0), and the direction of transfer must be indicated on line Read. SBus controller 4 samples the virtual address on the data lines on the rising edge of the clock, and translates the virtual address into a physical address. At such time as the translation is complete, SBus controller 4 generates a physical address on lines PA, the address strobe signal on line AS*, and a select signal on line Sel* to the selected SBus device, completing the translation cycle. In the slave cycle, the SBus device which requested access either receives (in a write) or presents (in a read) data on the data lines of SBus. Upon completion of the transfer, the SBus device asserts the appropriate acknowledgement on SBus lines Ack(2:0). Assertion of LateError* may occur two cycles after the acknowledgement, if appropriate.

According to the SBus architecture, the number of expansion slots are limited, as indicated in FIG. 1, which accordingly limits the expansion capability and thus limits the number of customized system input/output and graphics options for a single workstation. The conventional solution for providing a wider selection of options is to network several SBus workstations together, so that each of the workstations can access an expansion slot in another workstation. This networking can either be accomplished by distributing the options among the networked workstations, or alternatively by providing a network server to control the access of the optional devices. This particular solution is of course prohibitively expensive for smaller systems (e.g., a single workstation environment); in addition, such a network can increase SBus traffic, reducing system performance. Furthermore, some add-on functions may not be accessible by way of the network, requiring those functions to be installed in each workstation that needs the function.

Another technique for adding more expansion devices than slots is to add a level of hardware hierarchy to the system. For example, an add-on card may be utilized which connects into a single expansion slot of the bus, and which itself has multiple expansion slots, thus allowing for multiple add-on peripheral cards to communicate through a single expansion slot in the main computer workstation. Such a device is commonly referred to in the art as an expansion chassis.

The architecture of the bus can present certain limitations to such expansion chassis devices, however, particularly in the case of the SBus. Since SBus expansion slots are memory mapped, each of the multiple add-on functions implemented into the expansion chassis must fit into the portion of the memory address space assigned to the SBus expansion slot. Accordingly, the sharing of the memory space of the slot reduces the memory space available for each add-on function. Reduced memory space is especially a problem for those add-on functions (e.g., add-on memory cards) which necessarily require more than a proportionate share of the assigned memory address space.

Division of the slot memory space among several add-on functions also presents a challenge to the software, as such partitioning of the address space must be comprehended by the driver software. Accordingly, partitioning the slot memory space would require rewriting or reconfiguring of the driver software so that it would recognize the particular options, with additional rewriting required if a function is moved to another expansion slot.

Another limitation of such a hierarchal design is that another level of translation and communication is necessarily present, not only to determine which function has control of the SBus, but also to determine which add-on card in the particular expansion chassis has control of its own bus. This will add delay in each communication cycle between the SBus and the add-on card, which will not only affect system performance, but may violate the specification. For example, as noted hereinabove, the virtual address is expected on the SBus at the end of the first clock cycle after assertion of the bus grant signal. Delay in providing the virtual address, due to the extra level of hierarchy, can cause the SBus controller to translate the wrong address value, causing system failure.

It is therefore an object of this invention to provide an expansion chassis for a computer which allows for add-on cards and functions of varying address space requirements to be incorporated into the system.

It is a further object of this invention to provide such a chassis which includes a memory management unit therewithin for managing the address space required by the add-on cards.

It is a further object of this invention to provide such an expansion chassis which allows for initial configuration and setup of the add-on cards in the expansion chassis in a transparent manner to the CPU and to driver software executed thereby.

It is a further object of this invention to provide such a chassis which communicates with the add-on cards in a pipelined fashion, in order to meet bus timing requirements.

It is a further object of this invention to provide such a chassis which allows for direct memory access between an add-on card in the expansion chassis and another device on the bus, while still meeting the timing requirements of the bus.

It is a further object of this invention to provide such a chassis which can perform a burst mode DMA operation in a pipelined manner, meeting the SBus timing requirements.

Other objects and advantages of the invention will be apparent to those of ordinary skill in the art having reference to the following specification together with its drawings.

SUMMARY OF THE INVENTION

The invention may be incorporated into an expansion chassis which couples, by way of a host board, into an expansion slot of a computer system with a bus architecture. A memory management unit (MMU) is provided which provides address translation between the bus and the expansion devices, thus providing an additional level of indirection. The device ID PROM codes are loaded into read/write memory in a contiguous manner that allows for transparent driver software operation. According to another aspect of the invention, a local DMA operation is initiated prior to the granting of the bus to the expansion chassis, so that the timing requirements of the bus can be met. In addition, a data/acknowledge pipeline is provided which, in a burst transfer, keeps the expansion chassis at least one cycle ahead of the host computer.

DETAILED DESCRIPTION OF THE PREFERRED EMBODIMENT

Figure 1:
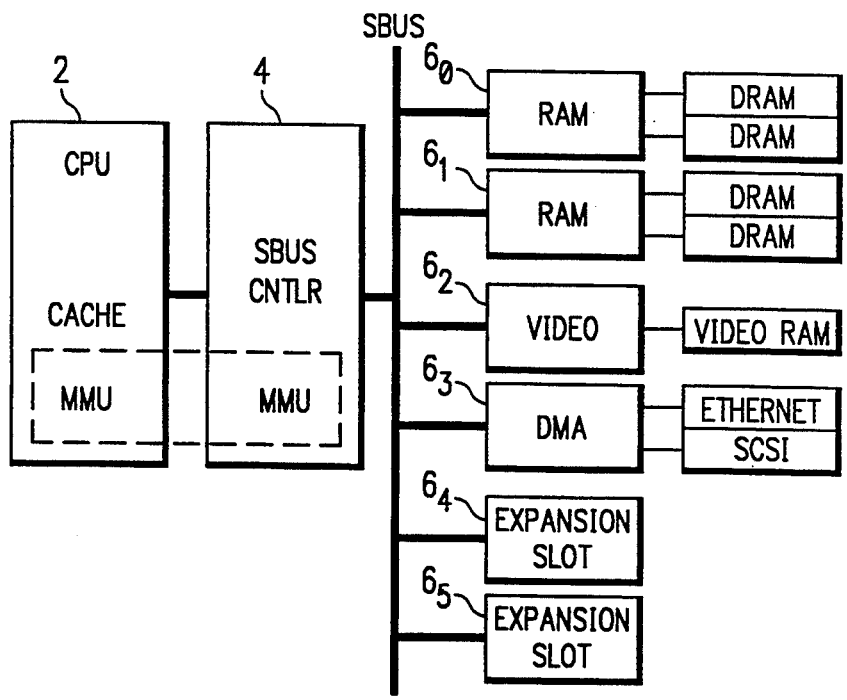
FIG. 1 is an electrical diagram, in block form, of a conventional SBus host-based system.
Figure 2:
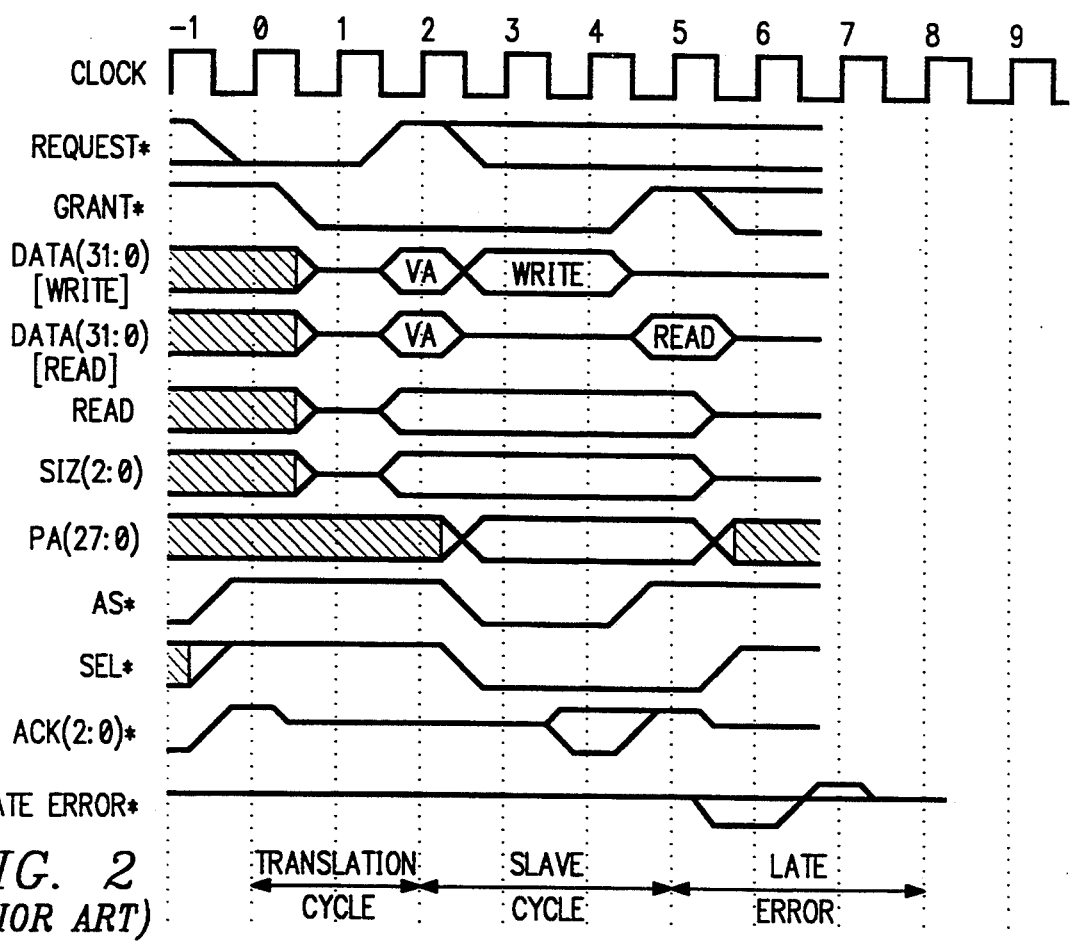
FIG. 2 is a timing diagram illustrating the timing of various signals on the SBus in a DVMA cycle, as performed by the system of FIG. 1.
Figure 3:
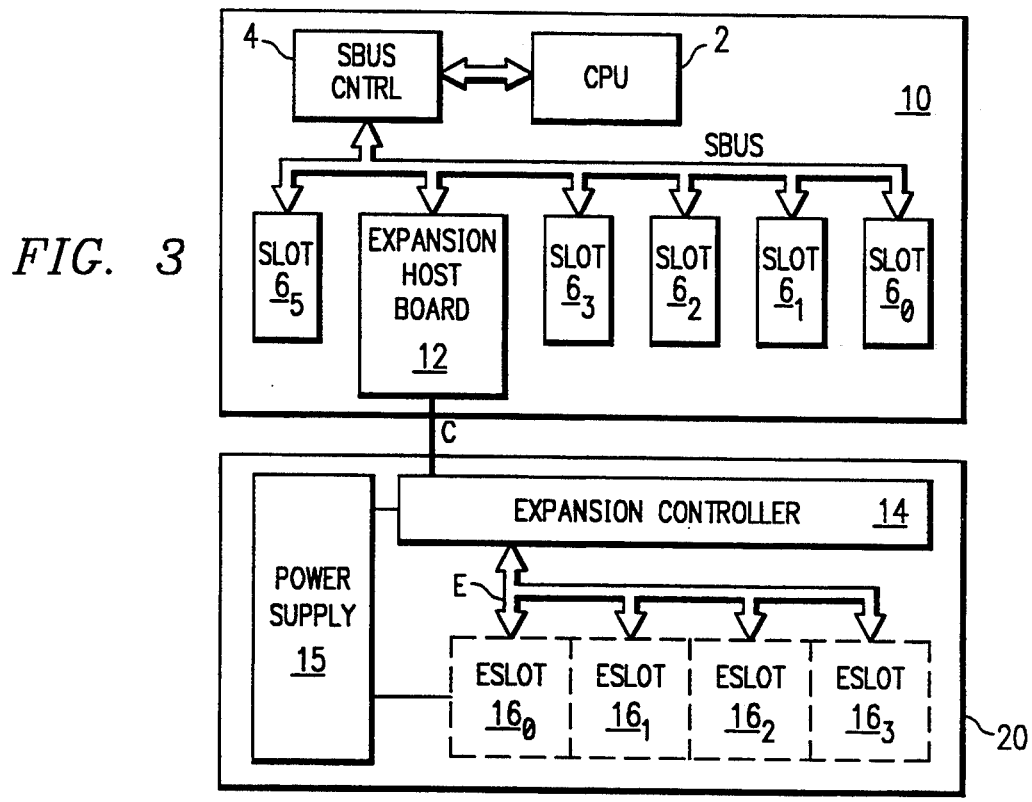
FIG. 3 is an electrical diagram, in block form, illustrating an SBus-based computer system including an expansion chassis according to the preferred embodiment of the invention.

Referring now to FIG. 3, an expansion system according to the preferred embodiment of the invention, as incorporated into an SBus-based workstation 10, will now be described in detail. As in the conventional arrangement shown in FIG. 1, workstation 10 includes SBus controller 4, connected to SBus to control traffic thereupon in the conventional manner. CPU 2 is in communication with SBus controller 4 in the host-based configuration in this example; as noted hereinabove, CPU 2 may alternatively be connected directly to SBus in the so-called symmetric configuration. As is conventional for "SPARC" workstations, CPU 2 may include such functions or circuits as "SPARC" IU, "SPARC" FPU, cache memory, and a memory management unit (MMU). Physical slots $6_2$, $6_4$, $6_5$ are connected to SBus, with the usual video RAM function (not shown) connected to slot $6_2$; logical slots $6_0$, $6_1$, $6_3$ are also present in this system, as conventional.

According to this embodiment of the invention, expansion host board 12 is in one of physical slots $6_2$, $6_4$, $6_5$ (e.g., expansion slot $6_4$) of workstation 10. Expansion host board 12 (including the circuitry associated therewith, as will be described in further detail hereinbelow) is connected to expansion chassis 20 via cable C. Cable C includes substantially the lines and functions of SBus, together with additional signals as noted hereinbelow.

Expansion chassis 20 is preferably physically configured as a so-called "motherboard", with slots 16 located thereupon into which add-on options can be inserted and connected. The physical size of expansion chassis 20 is on the order of the size of a conventional "SPARC" workstation manufactured and sold by Sun Microsystems, Inc. Expansion chassis 20 includes its own power supply 15 and expansion controller 14. Expansion controller 14 is connected to slots 16 by way of bus E. Bus E is similar in configuration as SBus, but will include particular control signals and lines to enable its operation in conjunction with SBus timing specifications.

Figure 4:
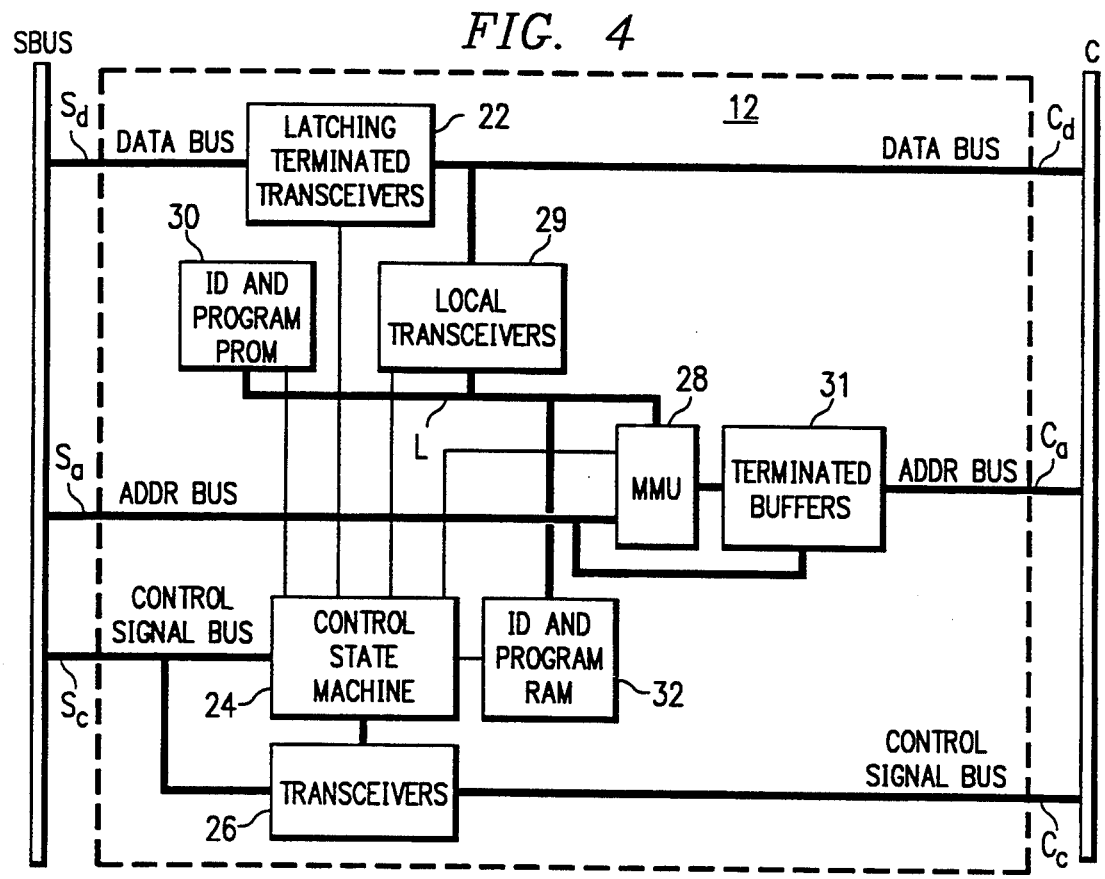
FIG. 4 is an electrical diagram, in block form, of the expansion host board of the system of FIG. 3.

Referring now to FIG. 4, the construction of expansion host board 12 will now be described in detail. As is well known, SBus may be considered as three parallel buses; these buses include control bus $S_c$, address bus $S_a$, and data bus $S_d$. Accordingly, cable C will similarly include data bus portion $C_d$, address bus portion $C_a$, and control bus portion $C_c$. Expansion host board 12 includes latching terminated transceivers 22 which are coupled between data bus $S_d$ and cable data bus $C_d$ for driving cable data bus $C_d$ and for receiving data therefrom. Terminated transceivers 22 are conventional latching buffer circuits, controlled by control state machine 24 in expansion host board 12, with series resistors implemented in order to reduce reflections due to cable C. In addition, local transceivers 29 are also connected to cable data bus $C_d$, for communication of data between local bus L and cable data bus $C_d$. Local bus L is also connected to MMU 28, PROM 30 and RAM 33 on host expansion board 12, as will be described hereinbelow.

Control state machine 24 is sequential logic configured in customized or programmable fashion to perform the control of the various elements of expansion host board 12, and to generate the appropriate bus signals on SBus and cable C, to accomplish the functions described herein. These functions include the decoding and timing control of the various SBus cycles directed to a device in expansion chassis 20 or to one of the local devices within host expansion board 12. In particular, control state machine 24 controls the direction of transceivers, latch signals, and DMA pipelining. For accesses to one of the local devices within host expansion board 12, control state machine 24 generates the read and write signals, and controls the direction of data flow through the transceivers. In addition, for accesses to the devices in expansion chassis 20, control state machine 24 controls address translation, transceiver direction and signal synchronization; for DMA cycles between SBus and one of these devices, control state machine 24 also controls virtual address latching, transceiver direction and burst write data and acknowledge pipelining. Further details on the operation of these cycles will be described hereinbelow. Accordingly, it is contemplated that one of ordinary skill in the art having reference to this specification will be able to readily implement such sequential logic.

Control state machine 24 receives control lines from SBus control bus $S_c$. Terminated transceivers 26 are connected to control bus $S_c$ and to cable control bus $C_c$, and also receive signal lines from control state machine 24; accordingly, transceivers 26 generate control signals onto cable bus $C_c$ and onto control bus $S_c$, and receive all control signals from cable bus $C_c$ and some of the signals from control bus $S_c$.

In similar manner as control bus $S_c$, address bus $S_a$ is connected to MMU 28 and to terminated buffers 31; terminated buffers 31 are also connected to cable address bus $C_a$. MMU 28 also has lines which are directly connected to terminated buffers 31. MMU 28 is connected to local bus L, and is under the control of control state machine 24, as are PROM 30 and RAM 32, to perform the operations described hereinbelow. Generally, MMU 28 provides the translation necessary in the additional level of address indirection utilized by the expansion system according to the present invention.

PROM 30 contains the executable code for configuring the expansion system so that the add-on options in expansion chassis 20 may be installed and operated without requiring modification of the driver software.

Figure 5:
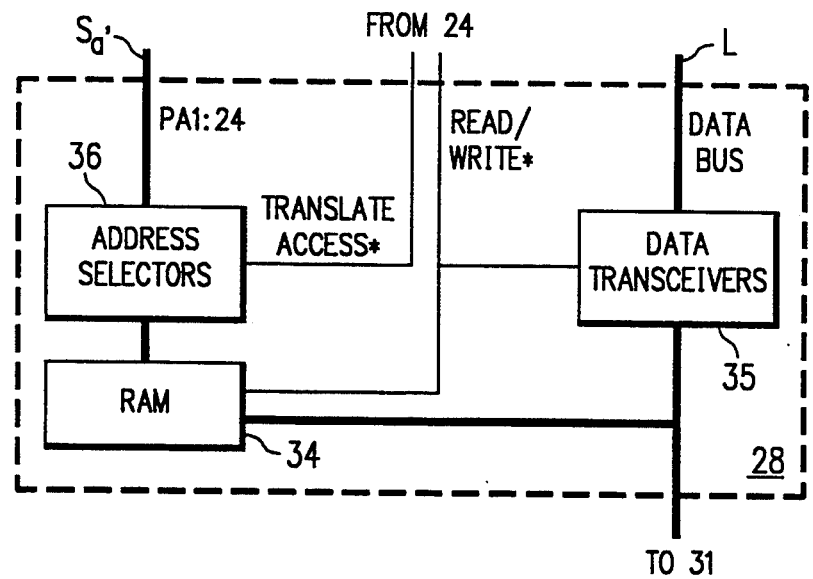
FIG. 5 is an electrical diagram, in block form, of the memory management unit of the expansion host board of FIG. 4.

Referring now to FIG. 5, the construction of MMU 28 will now be described in detail. MMU 28 may be configured in the conventional manner for a memory management unit, and as such the configuration of FIG. 5 is presented herein by way of example only. Included within MMU 28 is read/write random access memory (RAM) 34, having address inputs connected to address selectors 36, and having a data input/output coupled to data transceivers 35, for communication on local bus L, and to terminated buffers 31; an additional level of buffering between RAM 34 and terminated buffers 31, if desired. RAM 34 also receives a read/write* input (as well as other timing and control signals as necessary for its operation) from control state machine 24. In this embodiment of the invention, RAM 34 will serve as a read/write look-up table for translation of an SBus physical address to a physical address for an expansion device in expansion chassis 20. Accordingly, the access time of RAM 34 is preferably as fast as possible; an example of the implementation of RAM 34 uses a pair of cache RAM devices, as such devices have quite fast access times.

Address selectors 36 are connected to address bus $S_a'$, which are selected ones of the lines in address bus $S_a$, for example lines PA(24:1), and are connected to control state machine 24 to receive the translate/access* control signal therefrom. Address selectors 36 will select either the upper twelve or the lower twelve bits of address lines PA(24:1) for application to RAM 34, depending upon the cycle being performed by host expansion board 12. In this embodiment of the invention, the devices on host expansion board 12, including RAM 34, occupy the portion of the system address space from $0 \times 10000_h$ to $0 \times 13FFF_h$, and add-on devices in expansion chassis 20 may occupy the portion of the system address space above the address value $0 \times 18000_h$. Control state machine 24 monitors the address values on address bus $S_a$, and controls address selectors 36 and RAM 34 accordingly. For SBus addresses below $0 \times 10000_h$, address selectors 36 and RAM 34 ignore the addresses. For those SBus addresses between $0 \times 10000_h$ to $0 \times 13FFF_h$ that indicate a read or write access to the contents of RAM 34, address selectors 36 will select the lower twelve bits of address bus $S_a$ and apply it to RAM 34, and control state machine 24 will issue the appropriate read/write* signal to RAM 34 so that the desired access will occur. For SBus addresses above the address value $0 \times 18000_h$, indicating an access to an add-on function in expansion chassis 20 and thus a look-up table translation by RAM 34, control state machine 24 controls address selectors 36 to select the upper twelve bits of address bus $S_a$ and apply the same to RAM 34, and issues a read signal to RAM 34 so that the contents of the addressed portion are applied to transceivers 31.

Figure 6A:
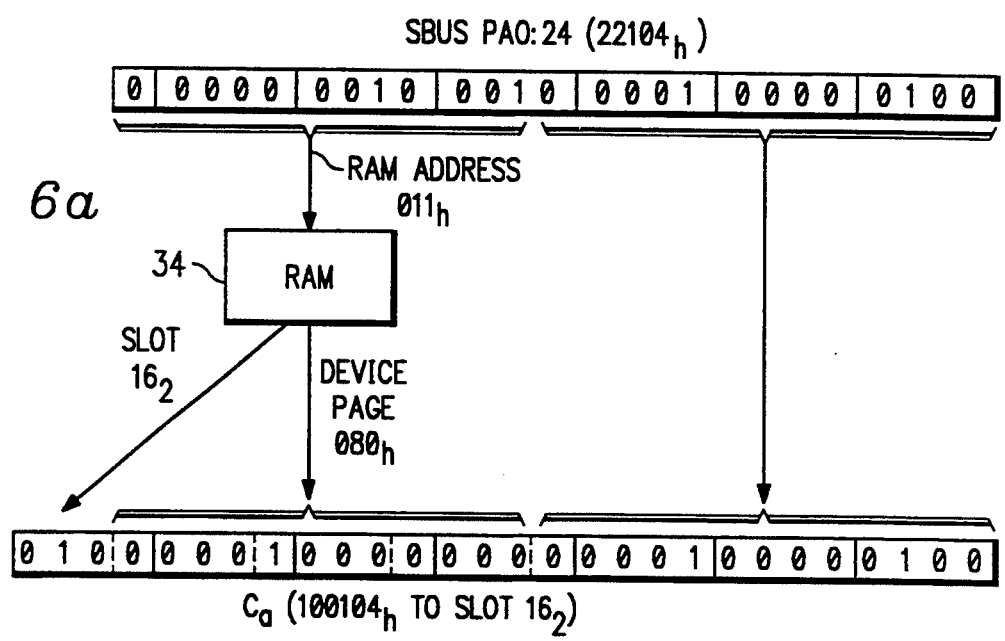
FIG. 6a are memory address values illustrating an example of the operation of the memory management unit of FIG. 5.

Referring now to FIG. 6a, an example of the translation of an SBus expansion address to a physical address for an add-on device will be described. In this example, SBus host physical address value $0 \times 22000_h$ (the fifth expansion page after $0 \times 18000_h$, expansion pages of 8 k size being used in this embodiment of the invention) corresponds to a device physical address value $0 \times 100000_h$ in the third slot $16_2$ of the expansion chassis 20. In the particular example of FIG. 6a, SBus address $0 \times 22104_h$ is to be translated into the proper value in the add-on device. At SBus, the thirteen least significant bits correspond to a particular address within the expansion page, and as such address bus $S_a$ lines PA(12:0) are communicated directly to lines PA(12:0) of cable address bus $C_a$.

The upper twelve lines PA(24:13) of address bus $S_a$ are received by MMU 28, in particular by RAM 34 via selection by address selectors 36 under the control of control state machine 24, since the value of the address exceeds the $0 \times 18000_h$ threshold. The memory location $022_h$ in RAM 34 (from the viewpoint of CPU 2; the actual address seen by RAM 34 is $011_h$) has previously been loaded with the device page value $080_h$ together with the slot selection code $010_2$ for slot $16_2$. These values are communicated to terminated buffers 31, which places the slot selection code $010_2$ on lines PA(27:25) of cable address bus $C_a$ and which places the device page value $080_h$ on lines PA(24:13) of cable address bus $C_a$. Cable address bus $C_a$ thus presents a physical address value of $0 \times 100104_h$ with a slot selection code of $010_2$. MMU 28 thus provides the necessary translation for the extra level of indirection in this embodiment of the invention. The loading of RAM 34 with the translation table contents will be described hereinbelow.

It should particularly be noted that the generation of the contents of RAM 34 corresponding to SBus address values is arbitrary. As such, the physical addresses generated to the add-on devices are not necessarily limited to page lengths of 8 k, as in the above example. MMU 28 thus allows for add-on devices of varying memory sizes to be incorporated into expansion chassis 20, maximizing the memory space utilization. For example, a graphics frame memory may require much more than 8 k memory address space, while other add-on devices (e.g., modems) require much less. Accordingly, by design of the contents of RAM 34, sufficient memory may be assigned to the graphics frame memory space from that of the other devices, so that the sum total of the memory space for all slots 16 does not exceed that provided by SBus. In this way, memory address space not utilizable by some of the devices may be assigned to those which require more.

As is well known in the art, add-on devices or functions suitable for installation into an expansion slot of many conventional systems, such as the SBus-based system described herein, each include a so-called ID PROM which may be accessed from the bus. In SBus systems, the device ID PROM is accessible at address 0 when the SBus controller has selected its expansion slot 6. The information in an SBus-compatible ID PROM includes a string of bytes which identify the add-on device type, manufacturer, model number, and the like. In addition, the ID PROM may also include an executable program which can configure the device on power-up, and also to provide the system information about the operation of the device which may be used by the device driver. In providing a hierarchal expansion system as described hereinabove, however, since the ID PROMs in each of the add-on devices in expansion chassis 20 are at address 0, selection of multiple devices associated with the same slot 6 must be prevented.

Figure 6C:
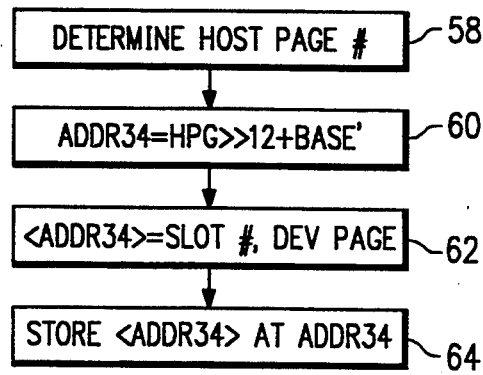
FIGS. 6b, 6c and 6d are flow diagrams illustrating the setup process for the host expansion board of FIG. 4.

Host expansion board 12 provides the capability for CPU 2 to organize ID PROMs for the add-on devices into contiguous memory locations, and also to map the addresses received on SBus into addresses for the various add-on devices via RAM 34, in a manner which is transparent to the device driver software in the system. FIGS. 6b and 6c illustrate the operation of MMU 28 in providing this function.

FIG. 6b is a flow diagram illustrating the process of copying the ID PROM information from devices in each of the expansion slots 16 in chassis 20 into RAM 32 in host expansion board 12, such that information about each of the add-on devices may be retrieved by SBus controller 4 or CPU 2 at address 0 for the associated slot 6. The instruction code for the process of FIG. 6b is stored in PROM 30, in a form executable by CPU 2. On power-up or other system reset, CPU 2 reads the ID PROMs of the devices in its slots 6 on SBus. PROM 30, serving as the ID PROM for host expansion board 12, includes a first word $FD_h$ at its memory address 0, which indicates that its slot 6 is occupied. Upon receipt of this code, program control is transferred to PROM 30, and CPU 2 begins execution of the program stored in PROM 30 after memory address 0, as will now be described.

Process 40 initializes host expansion board 12 on power up, allocates memory in RAM 32, and sets a pointer to slot $16_0$ of expansion chassis 20. As will be noted hereinbelow, RAM 32 preferably has a programmable address range, which will allow its subsequent reallocation to overlay portions of PROM 30. Process 42 reads the first byte of address 0 in the add-on device of the selected slot 16, for example slot $16_0$, via cable C and expansion controller 14. As will be described in further detail hereinbelow, a circuit is provided in expansion controller 14 which, if no device is inserted in the selected slot 16, will return the value $FF_h$ after a time-out period has elapsed. A validly installed add-on device in the selected slot 16 contains the value $FD_h$ in the first byte of address 0. Due to this time-out circuit, expansion host board 12 is able to detect an empty slot 16 by way of a positively returned value. This avoids a data exception or other uncontrolled event which can otherwise occur when an empty slot is accessed. Test 43 tests the returned value from the first byte of address 0 from the selected slot 16. If the returned value is not $FD_h$ (i.e., selected slot 16 is not occupied), test 45 is performed to determine if the selected slot 16 is the last slot; if slots 16 remain, the selected slot 16 is incremented in process 44 and process 42 which reads the first byte is performed for the next slot 16. If the last slot 16 is vacant, the initialization process is completed by overlaying the addresses of RAM 32 over the empty portions of PROM 30 in process 46, so that RAM 32 appears as the ID PROM for expansion host board 12, from the viewpoint of SBus.

Upon test 43 finding that the selected slot 16 is occupied by a valid SBus-compatible device, process 48 is initiated by which CPU 2 begins reading the ID PROM of the device in the selected slot 16 (after skipping the first eight bytes). In this example, the ID PROM is read byte-by-byte, as some information therein is in single byte form. As is well known for SBus-compatible devices, data of various types may be stored in the ID PROM, such data including offset values for particular memory locations in the device, variable data, single-byte and multiple-byte instructions, and the like. Process 50 is thus performed, by which data of various types are identified. In particular, the ID PROMs often indicate an "offset" value corresponding to an address at which memory locations in the add-on card may be accessed. The memory locations referred to by these offset values may be registers, or entire memories in the add-on devices. Since the contents of the ID PROMs are stored into RAM 32 in contiguous fashion according to this embodiment of the invention, modification of the offset values stored in RAM 32 from those in the add-on devices is required.

Figure 6D:
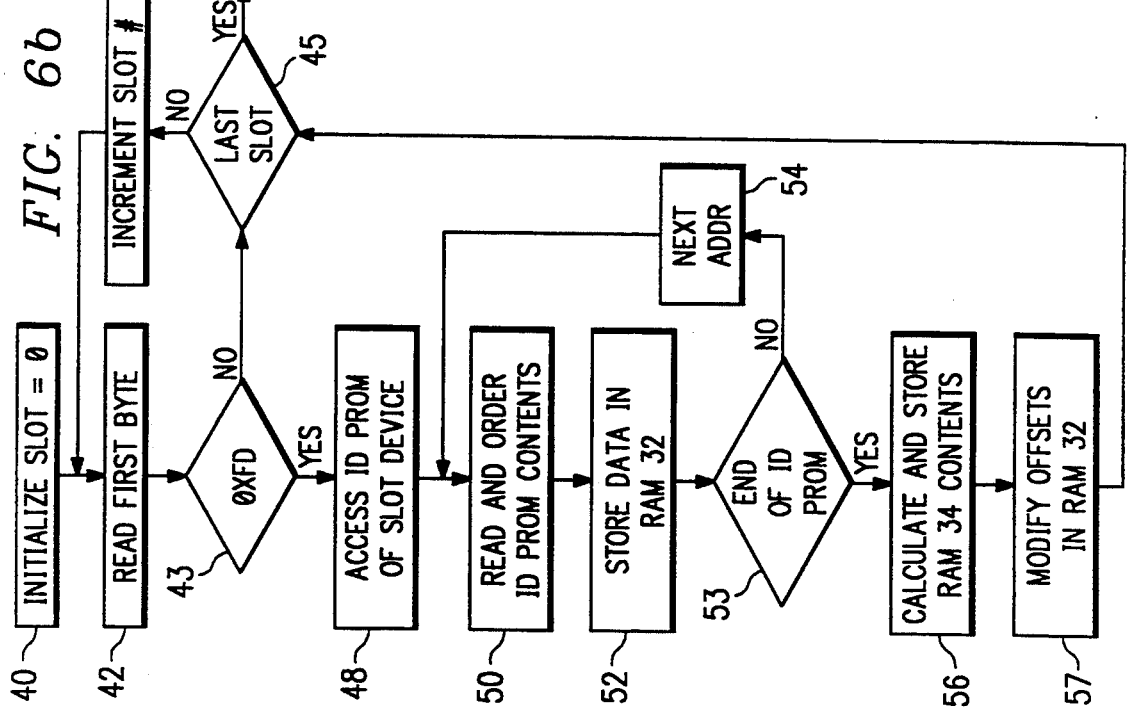
Figure 6B:
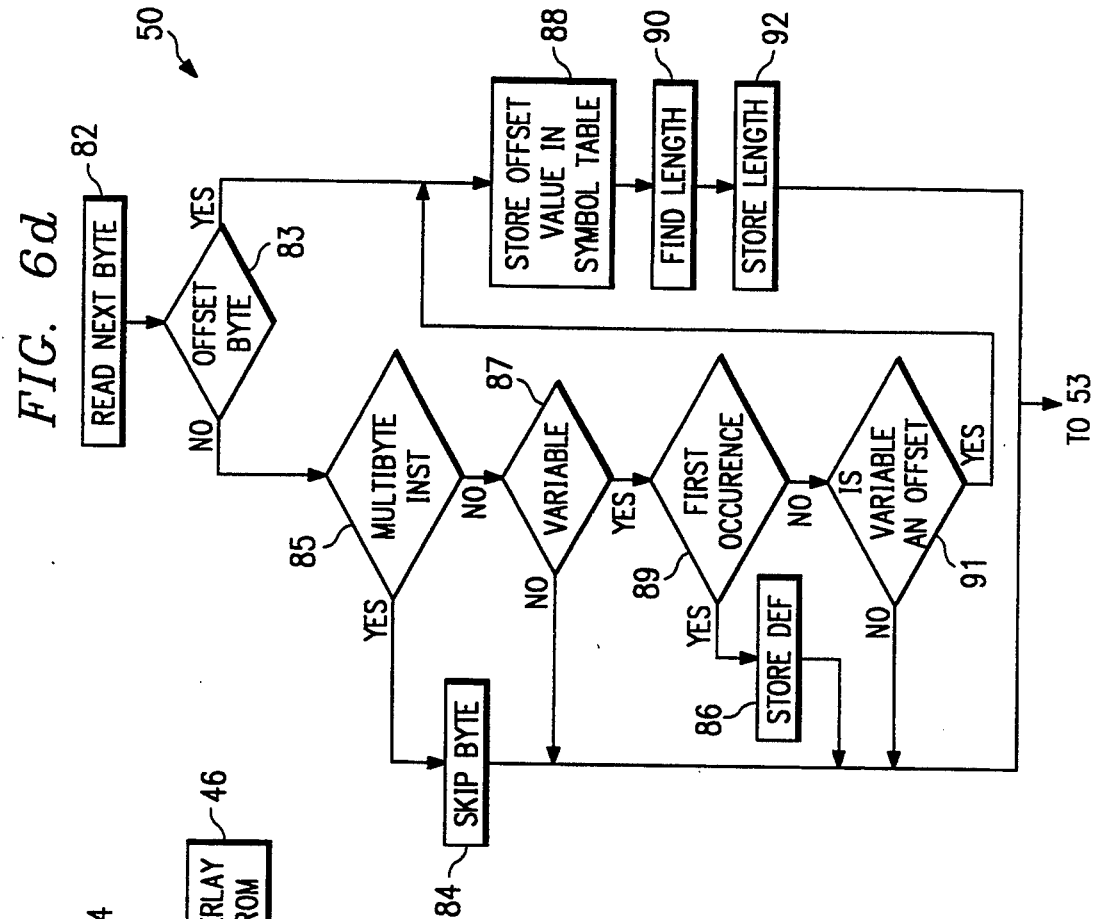

Referring now to FIG. 6d, process 50 will be described in further detail. Process 82 reads the next byte of the ID PROM in the selected slot 16. Test 83 interrogates the code of the read byte to determine if it is an offset value for a register or memory location; if so, process 88 is next performed as will be described hereinbelow. If not, test 85 determines if the read code is a multiple-byte instruction, in which case the next byte will be skipped (process 84) with control passing to process 52 to store the read byte in RAM 32, followed by test 53 to determine if the ID PROM is fully read. If the byte is not the first byte of a multiple-byte instruction, test 87 determines if the byte is a variable, passing to store process 52. If the byte is a variable, test 89 is performed which determines if this is the first instance of this variable. For the first instance of variables, the variable definition is stored in RAM 32 by process 86, and process 52 is then performed, followed by test 53 to read the next byte if any remain. Test 91 is performed for second and later occurrences of variables to determine if the variable is being used as an offset; if not, the byte is stored in process 52 and the end of the ID PROM tested in test 53.

If either test 83 determines that the read byte is an offset byte, or test 91 determines that a read variable is used as an offset, control passes to process 88 in which the offset value is stored in a symbol table. Process 90 then reads the next byte or bytes of ID PROM to determine the length of the register or memory location to which the offset value refers, and stores this length value in RAM 32 along with the offset value. Test 53 is then performed to determine if more bytes remain.

Accordingly, at the end of the reading of the ID PROM in the selected slot, a symbol table for the add-on device will have been generated (in RAM 32) for the registers and other memory locations in the add-on device. Process 57, described hereinbelow, may then be performed to modify the values according to the contents of RAM 34 in MMU 28.

Process 52 stores the read ID PROM byte in RAM 32, including such offset and variable length data as appropriate for the information in the ID PROM, with test 53 determining the end of the ID PROM for the device in the selected slot 16. The addresses of the selected ID PROM are otherwise incremented by process 54, and the reading and storing processes repeated, until complete.

Upon completion of the reading and storing of the ID PROM of the device in the selected slot 16, process 56 is performed in which the contents of RAM 34 in MMU 28 are calculated and stored. Referring now to FIG. 6c, the process of calculating the translation look-up table will now be described.

As is well known, address bus $S_a$ of SBus includes twenty-eight physical address lines PA(27:0). In this embodiment of the invention, cable address bus $C_a$ also includes twenty-eight address lines, but which are mapped so that the least significant twenty-five lines correspond to memory addresses, and the three most significant lines correspond to slot selection signals. MMU 28 is to translate the value received on address bus $S_a$ into the physical address of the device, including a selection signal for its slot 16. In this embodiment of the invention, this is performed by the mapping of a device address value into RAM 34 at an address location corresponding to the page address on address bus $S_a$. The process of FIG. 6c illustrates the method by which the contents of RAM 34 are determined and stored.

In process 58, the host page values for selected slot 16 are determined. The host physical address values are twenty-five bit values corresponding to PA(24:0) on address bus $S_a$ which are to be associated with the particular add-on devices in the system. In actual operation of the system, the thirteen least significant bits of SBus address bus $S_a$ directly correspond to word locations in the add-on device, and are passed directly through to cable address bus $C_a$ by terminated buffers 31 (see FIG. 4). In process 60 performed by CPU 2, the host physical address value is first shifted to the right by twelve bits to consider the host page value as an address to RAM 34, and the base value of $0 \times 10000_h$ is added thereto so that control state machine 24 recognizes this address as directed to RAM 34. This generates the physical address ADDR34 of RAM 34 which is to correspond to the host page value of the device.

The offset values and other information contained in the ID PROM of the device in the selected slot 16 are next read by CPU 2 for generation of the contents <ADDR34> to be stored in RAM 34 at the address ADDR34 calculated above, by way of process 62. In this example, the contents <ADDR34> correspond to the physical offset of the device shifted right by thirteen bits, with the slot number in the three most significant bits. In process 64, memory location ADDR34 in RAM 34 from process 60 is loaded with the contents <ADDR34> from process 64. As a result, upon subsequent presentation of physical address ADDR34 on SBus, address selectors 36 (via the translate/access* signal and a read signal generated by control state machine 24) will select the upper twelve bits for application to RAM 34, with the accessed contents <ADDR34> presented by RAM 34 to terminated buffers 31, for presentation as address lines PA(27:13) on cable address bus $C_a$.

After loading of the appropriate RAM 34 contents for the device in the selected slot 16, test 45 and process 44 are performed to increment to the next slot 16, if any remain. Upon completion of the process of FIG. 6b for all occupied slots, RAM 32 will contain the contents of each of the ID PROMs of the installed add-on functions in expansion chassis 20, in contiguous memory locations in RAM 32. Accordingly, RAM 32 will appear to SBus as a single "ID PROM" with several functions therein, each of which are accessible by CPU 2 and other SBus devices in a manner which is transparent to the driver software conventionally installed in the system.

After calculation of the RAM 34 contents, the offsets stored in RAM 34 may not coincide with the offset values stored from the ID PROM contents in process 50. Accordingly, in process 57, the offsets in the symbol table are sorted by offset, and the offset values modified according to the contents of MMU 28 determined in process 56. After process 57, the contents of RAM 32 now properly refer to the expansion slot add-on devices, in a manner consistent with the contents of RAM 34 in MMU 28.

Referring back to FIG. 6b, upon completion of the process for all slots 16, process 46 is performed by which the address range of RAM 32 is adjusted to overlay portions of PROM 30, such that the contents of RAM 32 will appear contiguously with the ID PROM contents of expansion host board 12 from the viewpoint of SBus. This overlaying of PROM 30 locations with RAM 32 address space is particularly beneficial in SBus based systems, considering that the expansion code is written in FORTH, which is a relatively slow interpreted language, and which does not provided for a JUMP command. Since PROM 30 is not totally filled with the instructions for the above-described process, the remaining locations contain no-operation (NOP) codes, each of which must be executed in order to reach the end of PROM 30, and to get to the ID PROM contents of RAM 32 if RAM 32 address space were to begin after PROM 30 address space. Therefore, according to the present invention, the address space assigned to RAM 32 is adjusted so that the contents of RAM 32 containing the ID PROMs of the installed add-on devices begin at the end of the contents of PROM 30 which are directed to the identification codes, and overlaying the instruction codes of the process of FIG. 6b. Subsequent reading of the "ID PROM" locations of host expansion board 12 (such as is done upon system configuration commands, or initialization of driver software) thus will not require the performing of a large number of NOPs, will occur much more quickly, and will also protect the expansion software method of FIG. 6b so that it cannot be read. It is preferred that the adjustment of the address range for RAM 32 be irreversible, except by system reset, to further hide the contents of PROM 30 which contain the process of FIG. 6b.

Figure 7:
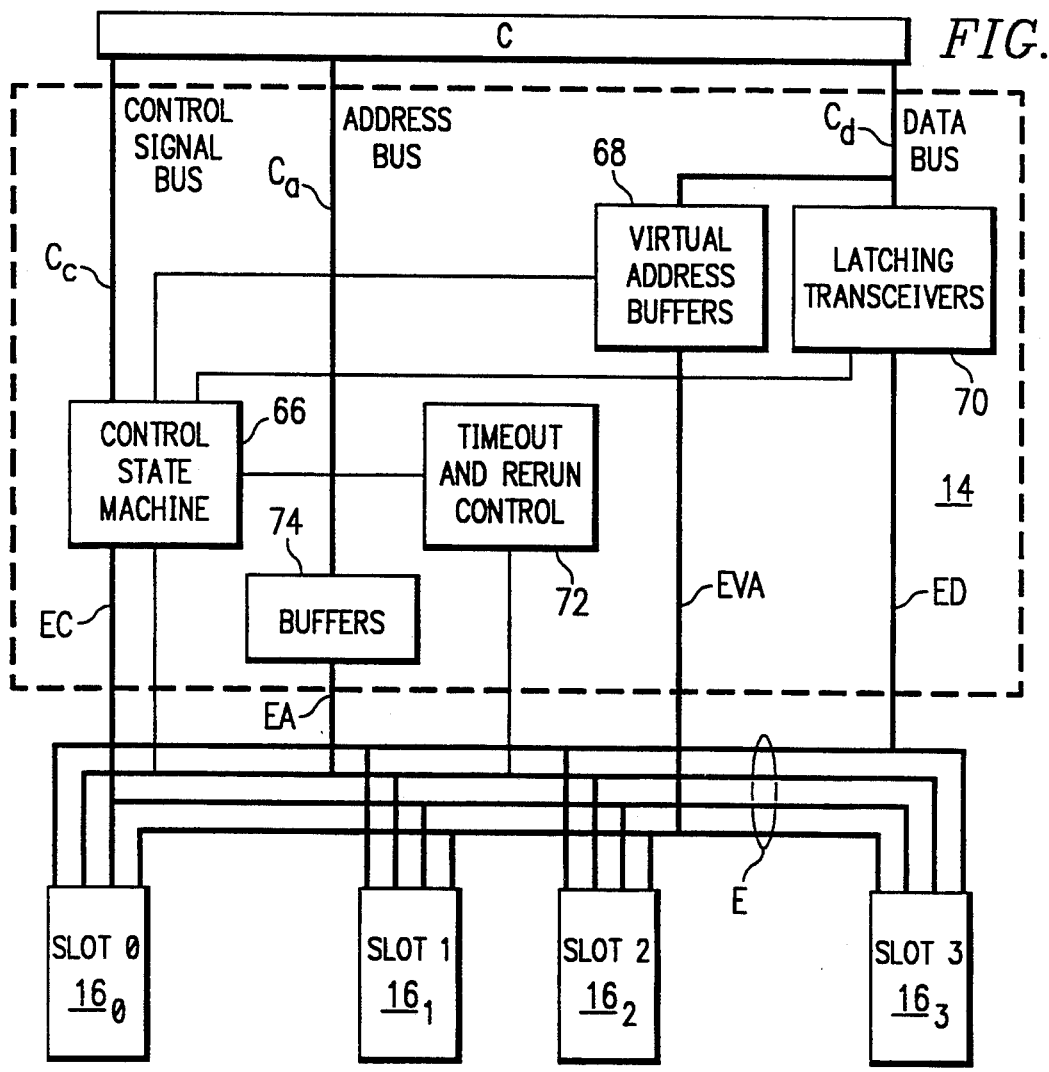
FIG. 7 is an electrical diagram, in block form, of the expansion chassis of the system of FIG. 3.

Referring now to FIG. 7, the construction of expansion controller 14 will be described in detail. Control state machine 66 is connected to cable control bus $C_c$, and consists of sequential logic for controlling the operation of expansion controller 14 and for generating control signals on expansion control bus EC to slots 16, responsive to control signals received on cable control bus $C_c$. Buffers 74 receive address lines PA(27:0) from cable address bus $C_a$ and drive expansion address bus EA with the appropriate value, including the three lines PA(27:25) for selection of the desired slot 16.

Timeout and rerun control circuit 72 is also connected to expansion address bus EA and to control state machine 66. Circuit 72 is sequential logic for performing the time-out function described hereinabove, generating an $FF_h$ code to cable data bus $C_d$ when the first byte of memory address 0 is presented to an empty slot 16. In this example, the $FF_h$ code is generated after 248 SBus clock cycles elapse after the SBus address strobe signal, as it is safe to assume that an installed device would have responded within that time. The code is stored in a register within circuit 72, accessible by addressing slot $16_4$ (since only four slots $16_0$ through $16_3$ are incorporated into expansion chassis 20). In addition, if CPU 2 requests access to the slot 16 containing an add-on device for which a DMA operation has been initiated prior to requesting SBus (as will be described hereinbelow), circuit 72 will generate a rerun acknowledge signal to CPU 2, causing CPU 2 to reexecute the last command until the add-on device has requested the SBus and effected the DMA, after which the desired access may be granted.

Latching transceivers 70 are coupled between cable data bus $C_d$ and expansion data bus ED, for latching and communicating data therebetween; virtual address buffers 68 are also coupled to data bus $C_d$ for latching and buffering virtual address information communicated thereupon in DMA cycles. Slots 16 accordingly receive expansion data bus ED from latching transceivers 70, and virtual address bus EVA from virtual address buffers 68. Virtual address bus EVA generated by expansion controller 14 will be used to communicate and latch virtual addresses in the initiation of DMA cycles between a device in expansion chassis and SBus, so that SBus timing requirements can be met by the system. The operation of expansion controller 16 will be described in detail hereinbelow.

Figure 8:
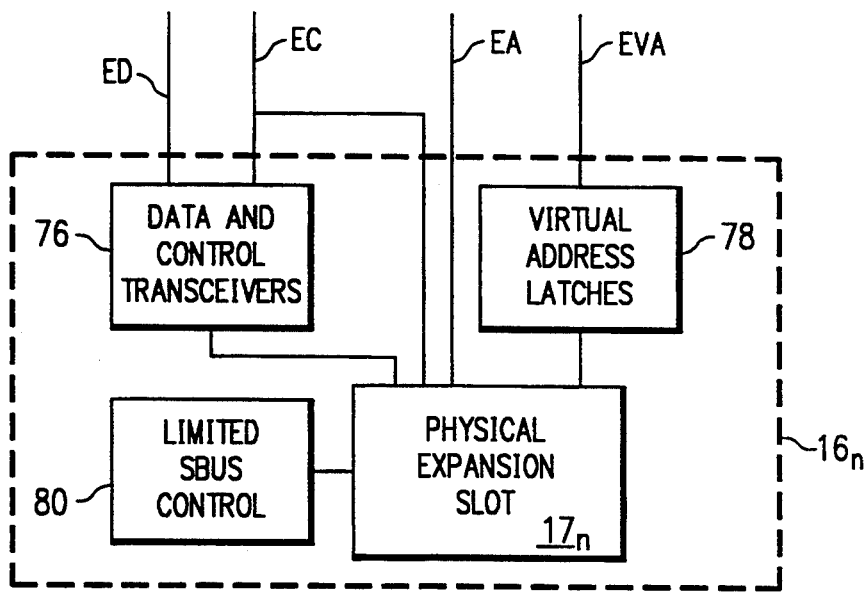
FIG. 8 is an electrical diagram, in block form, of the local controller for an expansion slot in the system of FIG. 7.

Located at each slot 16 is not only a physical connector but also additional latching and control circuitry. Referring now to FIG. 8, the construction of a slot $16_n$ will be described in additional detail. Slot $16_n$ includes a physical expansion slot $17_n$ into which the add-on device may be physically installed, a typical example of such being a pin and socket connector. Expansion slot $17_n$ receives certain lines of expansion control bus EC which are to be directly communicated to the add-on device. Virtual address latches 78 receive virtual address information on bus EVA from physical expansion slot $17_n$ and communicate the same to expansion controller 14. Data and control transceivers 76 receive expansion data bus ED and certain lines in expansion control bus EC (other than the control signals Ack (2:0), AS*, BR*, BG*, LERR* and SEL* which are generated by limited SBus controller 80), and communicate the same to physical expansion slot $17_n$. In addition, limited SBus controller 80 controls transceivers 76 and latches 78 in each slot $16_n$, and generates control signals to physical slot $17_n$ in a similar manner as SBus controller 4 does to expansion devices installed directly in connection with SBus. As will be described hereinbelow, transceivers 76 allow for isolation of each slot $16_n$ from the expansion data bus ED and control bus EC. This isolation allows for limited SBus controller 80 to begin the DMA operation in advance of the SBus grant signal, so that the device data can be presented at the appropriate time to SBus. Limited SBus controller 80, similarly as the controllers in expansion host board 12 and expansion controller 14, is preferably implemented as sequential logic.

Figure 9:
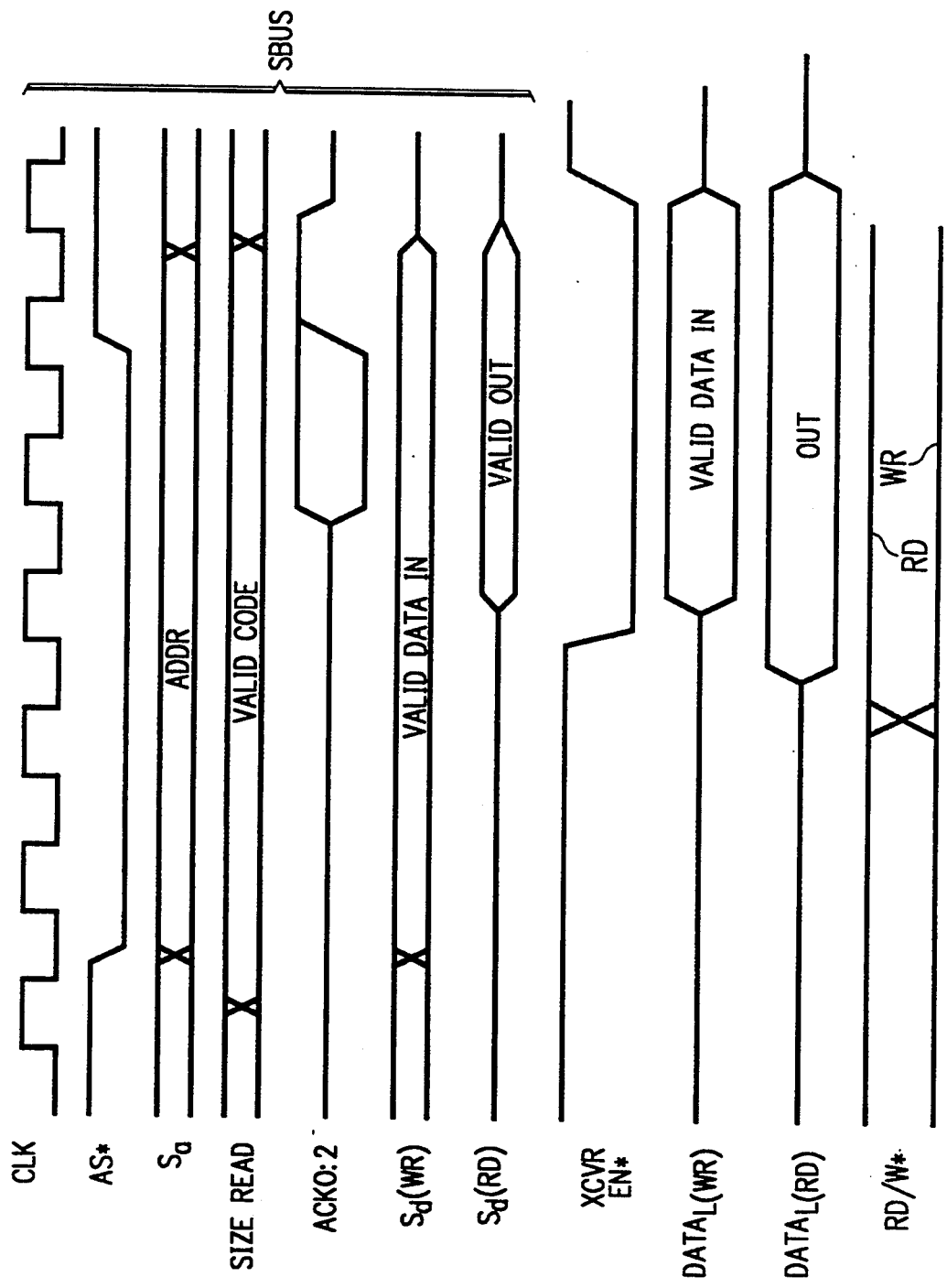
FIG. 9 is a timing diagram illustrating an access to a local device on the host expansion board of the system of FIG. 3.

Referring now to FIG. 9, the operation of expansion host board 12 in executing a local read or write operation to a device thereupon will be described. Clock CLK is the SBus clock generated by SBus controller 4, upon which the SBus operation is based. After the usual translation cycle (not shown), SBus controller 4 issues a physical address PA on address bus $S_a$, together with an active level on address strobe AS*. The SBus master requesting the operation (e.g., CPU 2 via SBus controller 4) also generates the appropriate size code and read/write signal and places the same on SBus. If a write cycle is to be performed, the master will drive the data bus lines $S_d$ of SBus at this time.

Responsive to the address strobe signal on line AS*, together with the value of the physical address PA indicating a local address on expansion host board 12 (i.e., between $0 \times 00000_h$ and $0 \times 13FFF_h$), control state machine 24 will control the operation of expansion host board 12 to perform the desired action. In the event of a read (i.e., data is to be read from expansion host board 12 and placed onto SBus), control state machine 24 will decode the address received on address bus $S_a$ for placement on address lines of bus L, for selection of the desired location in the local device (e.g., RAM 32). In the read operation, control state machine 24 will issue a read signal to the addressed device which, in response thereto and to the address value on bus L, will place its stored data on the data lines of bus L. At the appropriate time, control state machine 24 will enable transceivers 22, 29 by way of signal XCVR EN* to communicate the state of bus L to data bus $S_d$. On the next cycle of clock CLK, control state machine 24 will issue an acknowledge code on lines Ack(2:0), indicating completion of its operation.

Conversely, a write operation from SBus to a local device within expansion host board 12 is initiated by a control signal from SBus controller 4 which is received by control state machine 24. In this case, control state machine 24 issues a write signal (e.g., a low level on line RD/WR*) to the selected internal device, and enables transceivers 22, 29 to communicate the contents of data bus $S_d$ to local bus L. The addressed device (e.g., RAM 32) is then enabled to receive the data and store it at the location indicated by the address on address bus $S_a$; the operation is indicated as complete by the appropriate acknowledge code driven on SBus lines Ack(2:0) by control state machine 24.

In operations where data is being written from the SBus to a device in expansion chassis 20, the timing of responses by the device to SBus is not particularly critical. This is because SBus is not expecting data or control signals from the device at particular SBus cycles. Accordingly, the operation of the expansion system according to this embodiment of the invention in effecting read operations, from the viewpoint of expansion chassis 20 (i.e., write operations from the viewpoint of SBus) is relatively straightforward, as the data can ripple through expansion host board 12 and expansion controller 14 to slots 16.

However, particularly tight timing requirements are presented by the SBus specifications for operations where the add-on device is writing to SBus (a read operation from the standpoint of SBus). Specifically, these requirements include the requirement that the data must be present for one clock cycle immediately following the Ack(2:0) signal, which itself must be present for exactly one clock cycle, followed by the idle condition for exactly one clock cycle, followed by tri-state. Considering the additional level of indirection added by the system described hereinabove, synchronization of data from expansion chassis 20 onto SBus can be difficult.

Figure 10:
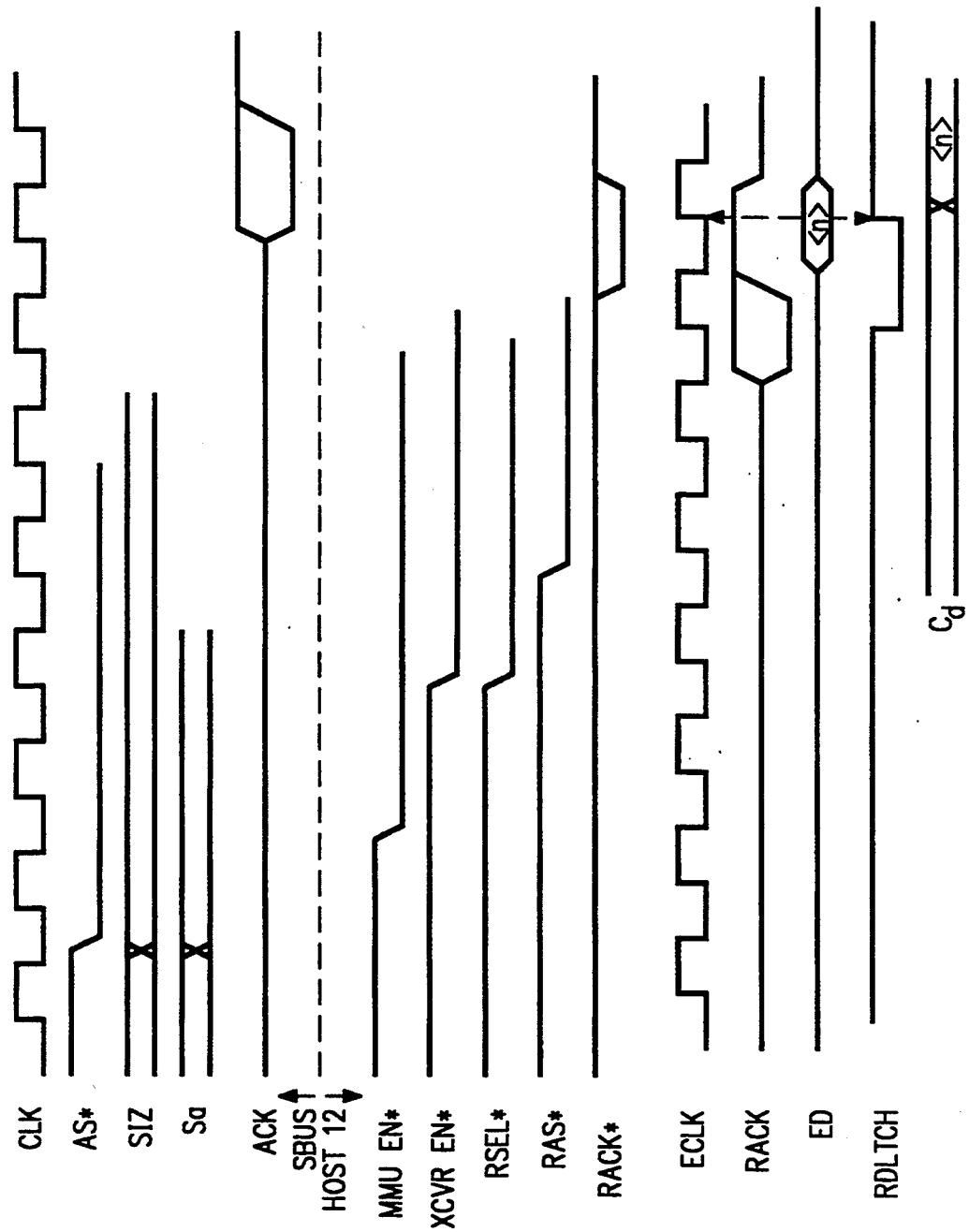
FIG. 10 is a timing diagram illustrating a slave cycle access to a device in the expansion chassis of the system of FIG. 3.

As noted hereinabove relative to FIGS. 4 and 7, however, latching transceivers 22, 70 are provided in the data path between slot 16 and SBus; in addition, latching transceivers 26 are provided in host expansion board for control signal presented to SBus, particularly Ack(2:0). This latching arrangement, and control thereof, provide the necessary synchronization during read of slave devices from SBus. FIG. 10 illustrates the operation of the expansion system according to the preferred embodiment of the invention in performing such an access.

As is conventional for SBus cycles, SBus controller 4 generates the clock signal CLK, address strobe AS* and the appropriate physical address signal on address bus $S_a$ (after the usual SBus translation cycle, not shown for purposes of clarity). The SBus master has also driven the transfer size code Siz(2:0) value at this time onto SBus. These signals initiate the slave access operation.

Responsive to the initiation of the cycle, control state machine 24 generates an enable signal MMU EN* to MMU 28; responsive to this enable signal, MMU 28 translates the physical address on address bus $S_a$ into the address to be placed on cable address bus $C_a$, as discussed above. After sufficient delay to allow for the translation by MMU 28, control state machine 24 enables transceivers 22 to communicate data between data bus $S_d$ and cable data bus $C_d$; no data is available at this time, however, as the device has not yet been accessed. Control state machine 24 also issues a remote select signal RSEL* to expansion controller 14, and thereafter the remote address strobe signal RAS*, causing expansion controller 14 to initiate the access of the device in the slot 16 selected by the three most significant bits of cable address bus $C_a$.

Within expansion controller 14, an analogous clock to the SBus clock signal is generated; in FIG. 10, this clock is shown as clock ECLK. Expansion chassis 20 operates in a similar manner as if cable C were the SBus. Accordingly, at such time as the access of the device in the selected slot 16 has been made, the device issues the remote acknowledge signal RACK and, exactly one cycle of clock ECLK thereafter, presents the read data therefrom on expansion bus ED. However, since expansion bus ED is remote from SBus, and due to the behavior of the SBus-compatible device to the SBus protocol, without additional circuitry the data on expansion bus ED cannot reach and remain at SBus within the specifications.

Accordingly, upon the next rising edge of expansion clock ECLK, limited controller 80 latches the value on expansion data bus ED into latching transceivers 70 by way of latch signal RDLTCH. It should be noted that the relationship between the rising edge of ECLK after RACK is asserted and the latch signal RDLTCH is quite critical, as the data must be latched according to the SBus specifications obeyed by the device in slot 16, as though bus E were SBus. Once latched by transceivers 70, the data is presented on cable data bus $C_d$ to host expansion board 12, for such duration as necessary for its communication to SBus.

Once the data is latched by transceivers 70, control state machine 24 in host expansion board 12 can issue the appropriate ACK signal onto SBus, and control latching transceivers 22 in such a manner as to read the latched data from cable data bus $C_d$ and present it to SBus at the appropriate time relative to the acknowledge signal ACK. As a result, the data read from the remotely located device in slot 16 is synchronized with the relatively stringent timing requirements of SBus-based systems.

DMA cycles where the expansion device is to be the DMA master include additional critical timing constraints which are particularly difficult to meet using an extra level of indirection, such as is necessary to increase the number of expansion devices in the SBus-based system. A first such constraint is that the DMA master must place the virtual address, Siz(2:0) code, and the Read signal (i.e., the signal indicating the direction of data transfer) onto SBus by the first rising edge of CLK after the bus grant (BG*) has been asserted by SBus controller 4. For cycles where the expansion device is writing data to the SBus (i.e., to memory, or to another device on SBus), the data to be written to SBus must be present by the first rising edge of CLK following the virtual address. A so-called DMA "burst" write presents the additional constraint that data must be valid by the first rising edge of CLK following the acknowledge code.

Figure 11:
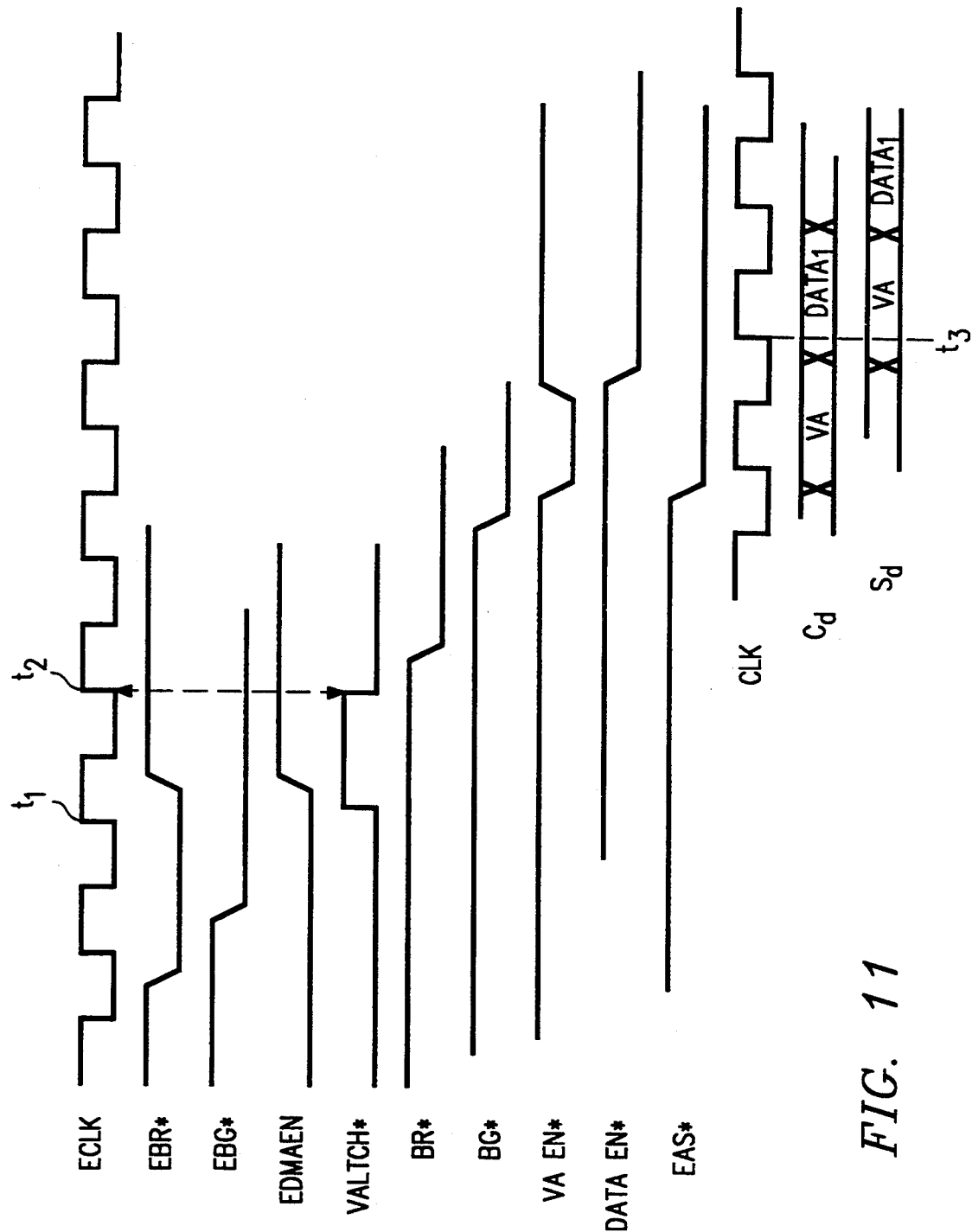
FIG. 11 is a timing diagram illustrating a DMA cycle between the SBus and a device in the expansion chassis of the system of FIG. 3.

The expansion system according to the present invention, as described hereinabove, includes the circuitry necessary to also meet these stringent timing constraints for DMA cycles. As a result, the expansion system according to the present invention enables the addition of more add-on devices than the number of slots provided in the SBus system (e.g., the "SPARC" workstations manufactured and sold by Sun Microsystems, Inc.) while still meeting the critical timing requirements. Referring now to FIG. 11, together with FIGS. 4, 7, and 8, the operation of this system will be described relative to a DMA cycle where an add-on device in expansion slot 16 is the DMA master.

The DMA cycle according to this embodiment of the invention is initiated by the add-on device in expansion slot 16 issuing a bus request signal. Since expansion slot 16 is in expansion chassis 20, however, this signal (EBR* in FIG. 11) is not on SBus but is first received by limited controller 80; expansion clock ECLK generated by expansion controller 14 is the time base for this activity. Controller 80 returns an expansion bus grant signal EBG* to slot 16, which is sampled by the device on the next rising edge of ECLK thereafter (time $t_1$ in FIG. 11). Accordingly, the device in expansion slot 16 operates, relative to bus E, in the same manner as if it were directly connected to SBus. The EBR* signal is communicated to expansion controller 14 which issues a DMA enable signal (EDMAEN) if the operation can be performed (i.e., the operation is not inconsistent with other operations currently under way by other add-on devices in expansion chassis 20).

Consistent with SBus timing requirements, the add-on device in expansion slot 16 will present the virtual address to which its DMA is to take place by time $t_2$, which is the first rising edge of ECLK after the BG* grant signal has been sampled. At this time, limited controller 80 issues a signal VALTCH* to virtual address latches 78 (FIG. 8) enabling it to latch the value of the virtual address presented by the add-on device. It should be noted that the timing of the VALTCH* signal is preferably synchronized with the rising edge of ECLK at time $t_2$, in order that the virtual address value presented by the device is properly latched onto expansion virtual address bus EVA.

With the virtual address latched in this way, the translation cycle (from the viewpoint of the add-on device) is effectively suspended until access to SBus is granted, since the address strobe AS* signal will not be presented to the add-on device. It is therefore important that accesses not be made to the add-on device which is requesting the DMA, as this would upset the DMA operation. According to this embodiment of the invention, any accesses to this slot 16 at this time will be detected by timeout and rerun control circuit 72, which will initiate a rerun acknowledge signal to SBus so that the requesting device (e.g., CPU 2) will repeat the access at a later time. After the DMA is completed, access to the add-on device is not inhibited by timeout and rerun control circuit 72.

Upon latching of the virtual address value by latches 78, expansion controller 14 (in particular, control state machine 66) will generate a bus request signal to host expansion board 12. Control state machine 24 will then present the bus request signal BR* on SBus, as shown in FIG. 11. The bus request signal BR* may be generated quickly, as shown in FIG. 11, or may be generated several cycles or more later, depending upon other operations being performed by expansion chassis 20 and host expansion board 12. SBus controller 4 will receive bus request signal BR* from host expansion board 12 and, at the appropriate time relative to other SBus traffic, will return the bus grant signal BG*.

After the bus grant signal BG* is received by the expansion system, control state machine 66 in expansion controller 14 generates a control signal VAEN* to virtual address buffers 68 causing them to receive the virtual address from expansion virtual address bus EVA, and to present the same onto cable data bus $C_d$. This is performed in advance of the expected virtual address cycle, preferably early by one cycle of clock CLK, to allow for propagation delays through expansion chassis 20 and host expansion board 12. Accordingly, by the time that SBus is expecting the virtual address data (at time $t_3$, one cycle after BG*), the virtual address presented by the add-on device is presented onto the data bus portion $S_d$ of SBus. Latching transceivers 22 are controlled by control state machine 24 to maintain the virtual address value on data bus $S_d$ for the full cycle, allowing cable data bus $C_d$ to be released and the first data word $DATA_1$ placed thereupon for the next cycle.

In a DMA write operation (i.e., direction of data transfer is from the add-on device to SBus), at approximately the same time as the VAEN* signal, expansion controller 14 also preferably generates an expansion address strobe signal EAS*. This signal is communicated via expansion controller 14 to slot 16, indicating to the device that it can begin presenting the data. This EAS* signal is also generated in advance, so that the add-on device can begin presenting the data (in a write operation to SBus) in sufficient time as to meet the requirement that data be present in the cycle after the virtual address is presented. Expansion controller 14 also generates a data enable signal DATAEN* thereafter, so that latching transceivers 70 receive the state of expansion data bus ED, latching this state onto cable data bus $C_d$ at the appropriate time, also preferably one cycle prior to the SBus required time, to allow for propagation delay in the same manner as for the virtual address. Latching transceivers 22 are then controlled by control state machine 24 to present first data word $DATA_1$ onto data bus portion $S_d$ of SBus at the appropriate time, as shown in FIG. 11. The cycle is then completed by the acknowledge code generated by the DMA slave device, in the conventional manner.

As a result of the expansion system according to this embodiment of the invention, an add-on device in one of expansion slots 16 can become the DMA master and meet the stringent timing requirements of the SBus-based system. The present invention thus enables more add-on devices to be incorporated into an SBus-based system than the limited number of slots available, with such devices capable of performing DMA operations as though they were directly connected to the SBus.

It should of course be noted that alternatives and modifications to the system may be made which further utilize the present invention. For example, the system described hereinabove uses single latches to retain the virtual address and the data presented by the add-on device. Alternatively, FIFOs or other multiple word buffers may be substituted for the latches, so that an entire cycle's worth of information may be latched in sequence. This modification would allow for so-called "atomic" SBus cycles, where more than one operation takes place per SBus arbitration, while still meeting the stringent SBus timing requirements.

A particular type of DMA cycle, namely a burst write DMA operation, presents additional stringent timing requirements. In a burst write operation, data is to be presented by the add-on device in successive cycles. Due to propagation delays, as well as the added level of hierarchy in the expansion system described hereinabove, insufficient time is present to allow for the rippling down of the control signals and the rippling back of the data to be written. The system described hereinabove is capable of performing burst write DMA cycles, as will be described hereinbelow relative to FIG. 12, in combination with FIGS. 4, 7, and 8.

Figure 12:
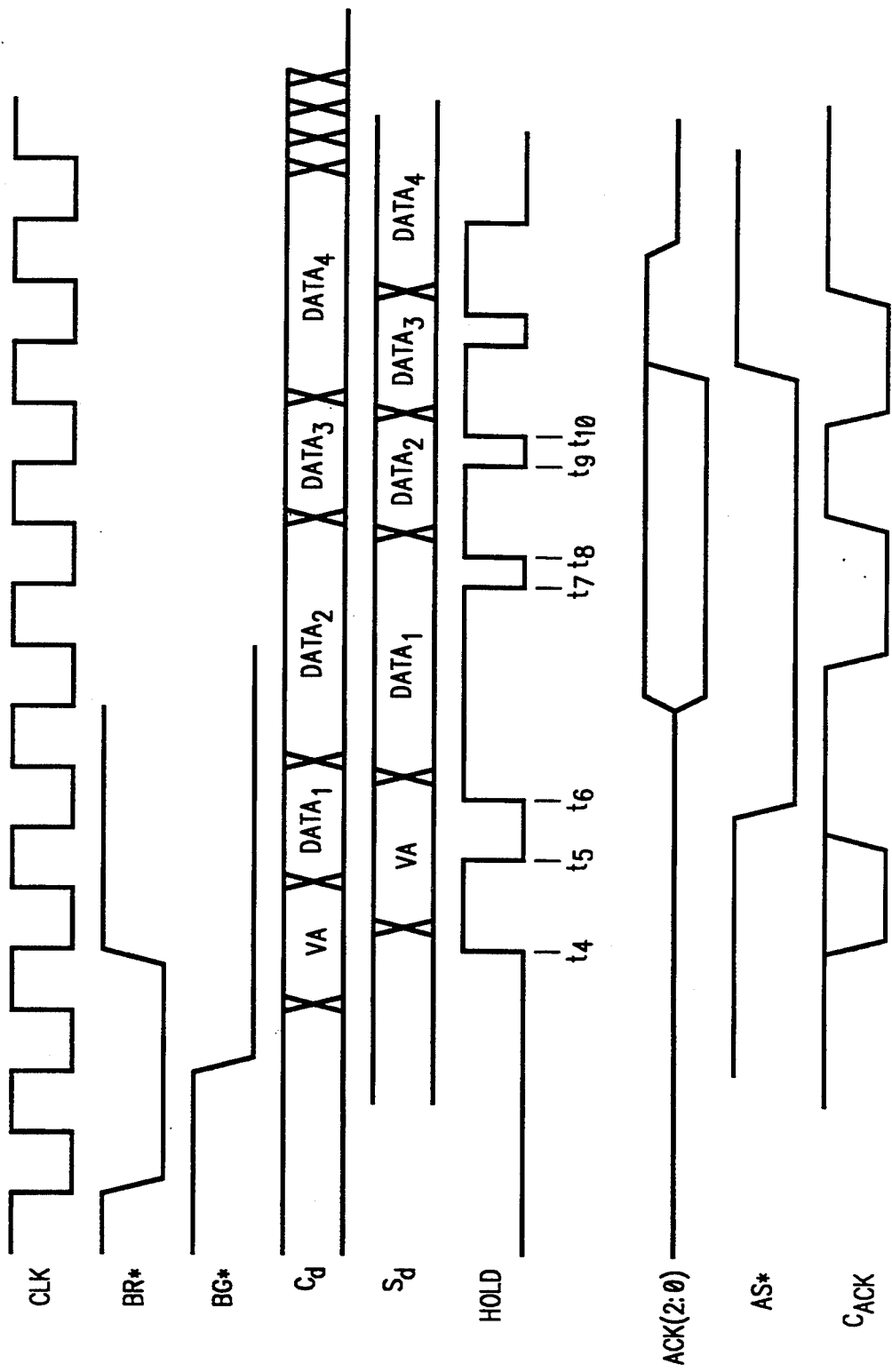
FIG. 12 is a timing diagram illustrating a burst DMA operation between the SBus and a device in the expansion chassis of the system of FIG. 3.

The DMA operation illustrated in FIG. 12 is initiated in the same manner as described hereinabove relative to FIG. 11. Accordingly, the virtual address from the add-on device in expansion slot 16 is presented, via cable data bus $C_d$, on the data bus portion $S_d$ of SBus by the end of the first clock CLK cycle after the grant signal BG* is issued by SBus controller 4. Following the clock cycle during which virtual address VA is presented, the first data word $DATA_1$ is similarly presented by the add-on device as described hereinabove.

At time $t_4$, however, control state machine 24 in host expansion board 12 issues a hold signal HOLD to latching transceivers 22. This HOLD signal latches the virtual address value at transceivers 22, so that the state of cable data bus $C_d$ can change (upon presentation of the next data word $DATA_2$) while maintaining data bus $S_d$ with the prior value. It should be noted that the timing of the HOLD signal is relatively critical, as it must occur prior to the transition of cable data bus $C_d$ with the next data word ($DATA_1$ in this case). In this example, it is preferable that the trailing edge of HOLD occur at approximately the halfway point in the clock CLK cycle, with the rising edge occurring at approximately the three-fourths point in the CLK cycle. The HOLD signal is disabled at time $t_5$, after SBus controller 4 has received the virtual address value on data bus portion $S_d$ of SBus, and prior to the necessary setup time for the next cycle.

After receipt of the virtual address value, SBus controller 4 presents the address value on the address portion $S_a$ of SBus, and asserts the address strobe signal AS*, indicating that the translation cycle is complete, and that the DMA cycle can continue. As described hereinabove, the first data word $DATA_1$ has already been presented by the add-on device, and is now presented by expansion chassis 20 onto cable data bus $C_d$. Prior to the next rising edge of clock CLK, at which SBus controller 4 will expect the first data word, signal HOLD is asserted, causing latching transceivers 22 to receive the data value on cable data bus $C_d$ and to present this value on data bus $S_d$ to SBus. Once latched, the next data word $DATA_2$ can be acquired responsive to the second occurrence.

In addition to the HOLD signal, control state machine 24 also initiates cable acknowledge signal $C_{ack}$ to expansion controller 14. This cable acknowledge signal $C_{ack}$ precedes the SBus acknowledge signal Ack(2:0) by at least one cycle, as it will initiate the filling of a data pipeline in expansion chassis 20. The $C_{ack}$ signal is passed along by expansion controller 14 to the DMA master (i.e., by way of a remote acknowledge signal RACK to the add-on device in expansion slot 16 which is generating the DMA operation) to indicate that the first data word $DATA_1$ has been received by the DMA destination (even though it has not yet been presented onto SBus), so that the add-on device begins acquiring the following data word $DATA_2$. In this way, the acknowledge signal $C_{ack}$ is a pipelined control signal, causing the add-on device to begin filling a data pipeline with the next SBus data required in the burst mode DMA write operation. Accordingly, soon after the second HOLD signal has been applied to latching transceivers 22 so that the first data word DATA$_1$ is maintained on data bus S$_d$, the second data word DATA$_2$ is presented on cable data bus C$_d$, its acquisition having been previously initiated by the first cable acknowledge signal C$_{ack}$.

This sequence of cable acknowledge signals C$_{ack}$ and HOLD signals continues for the burst mode operation until the acknowledge on lines Ack(2:0) of SBus has been received for the next-to-last data word. At this time, all data words DATA$_1$ through DATA$_4$ have been presented to cable data bus C$_d$. The final cable acknowledge C$_{ack}$ is delayed, however, until the SBus acknowledge for the final data word has been received, to prevent the add-on device DMA master from completing the DMA operation ahead of the final SBus acknowledge. In this way, an error acknowledge which is asserted by the recipient of the DMA operation (such an error acknowledge following the last word written thereto) can be accurately handled by the add-on device, as it will not be yet another data word ahead of the operation.

The present invention therefore enables the implementation of multiple add-on devices into a bus architecture system, especially such a system which has strict timing requirements such as are present in SBus-based systems. This implementation is enabled in such a fashion that relatively intricate operations, such as DMA operations and burst write DMA operations, can be performed while meeting the system specifications.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A data processing system, comprising:
   a bus, for communicating address, data and control signals;
   a bus expansion slot, connected to said bus;
   an expansion control system, coupled to said bus expansion slot and to a cable, comprising:
      a controller coupled to receive control signals from said bus;
   an expansion chassis, coupled to said cable, said expansion chassis comprising:
      a plurality of expansion slots, wherein each of said expansion slots is configured such that an add-on function may be installed in respective ones of said expansion slots;
      an expansion bus for communicating address, data and control signals between said cable and said expansion slots;
      a chassis controller, coupled to a control line of said cable and to said expansion slots;
      a first latch coupled between said expansion bus and said cable, controller by said chassis controller;
   wherein, during a direct memory access operation initiated by an add-on function installed into one of said expansion slots, said chassis controller issues a local grant signal to said one of said expansion slots so that said add-on function presents a first value onto said expansion bus responsive thereto prior to said bus presenting a bus grant signal to said expansion control system;
   and wherein said chassis controller controls said first latch to store the first value received on said expansion bus and to present said first value onto said cable, for a period of time after said expansion but no longer is communicating said first value.

2. The system of claim 1, wherein said first value is a virtual address value.

3. The system of claim 1, wherein said bus is of an SBus type.

4. The system of claim 1, wherein said expansion control system further comprises:
   latching buffers coupled between data lines of said cable and data lines of said bus, controlled by a hold signal generated by said controller so that said latching buffers drive said bus with a value presented on said cable during a direct memory access operation for a period of time after said cable no longer is presenting said value.

5. The system of claim 4, wherein, during a burst direct memory access operation, said controller generates a series of said hold signals so that said latching buffers latch a series of said values.

6. The system of claim 5, wherein the first of said values maintained by said latching buffers is a virtual address value.

7. The system of claim 6, further comprising:
   a second latch, coupled between said expansion bus and said cable;
   wherein said controller presents a remote address strobe signal to said expansion chassis after said add-on function presents said first virtual address value;
   wherein, responsive to said remote address strobe signal, said add-on function presents a second value onto said expansion bus;
   and wherein said chassis controller is also for controlling said second latch to store said second value for a period of time after said expansion bus no longer communicates said first value.

8. The system of claim 7, wherein said bus is of the SBus type.

* * * * *